United States Patent [19]

Eberhardt et al.

[11] Patent Number: 5,063,670
[45] Date of Patent: Nov. 12, 1991

[54] PORTABLE CUTTER TOOL

[75] Inventors: H. Alfred Eberhardt, Paoli; Daniel J. Carlsen, Philadelphia, both of Pa.

[73] Assignee: Hale Fire Pump Company, Conshohocken, Pa.

[21] Appl. No.: 592,706

[22] Filed: Oct. 3, 1990

[51] Int. Cl.⁵ .................... B26B 15/00; B26B 13/00; F16L 27/00
[52] U.S. Cl. ....................................... 30/228; 30/241; 285/272
[58] Field of Search ................. 30/92, 92.5, 227, 228, 30/237, 238, 245, 246, 249, 241; 7/151, 158; 285/167, 168, 272

[56] References Cited

U.S. PATENT DOCUMENTS

| | | | |
|---|---|---|---|
| 2,823,454 | 2/1958 | Kirchner | 30/241 |
| 3,024,530 | 3/1962 | Haskell et al. | 30/228 |
| 3,922,782 | 12/1975 | Lind | 30/228 |
| 4,026,025 | 5/1977 | Green | 30/241 |
| 4,343,498 | 8/1982 | Campanini | 285/272 |
| 4,676,000 | 6/1987 | James | 30/228 |

Primary Examiner—Douglas D. Watts
Assistant Examiner—Paul M. Heyrana, Sr.
Attorney, Agent, or Firm—Frank A. Follmer

[57] ABSTRACT

A cutter tool is constructed to be portable and maneuverable so that it can be used at an accident scene to extricate a victim that is trapped in place by the foot pedal and/or steering wheel of a vehicle by cutting the same to free the trapped victim.

15 Claims, 5 Drawing Sheets

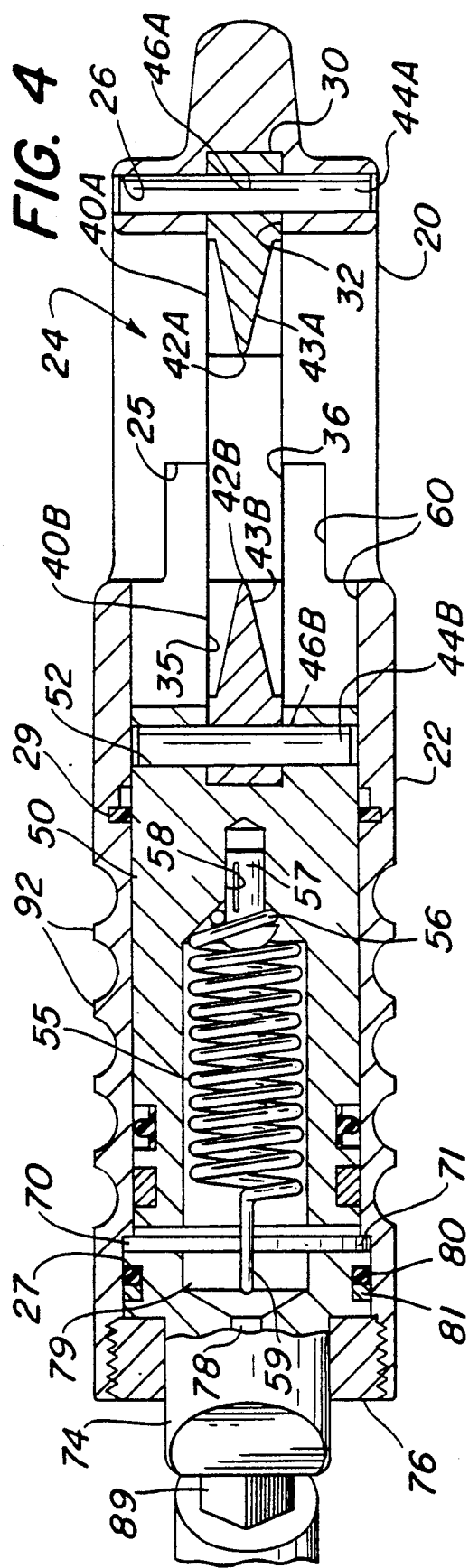
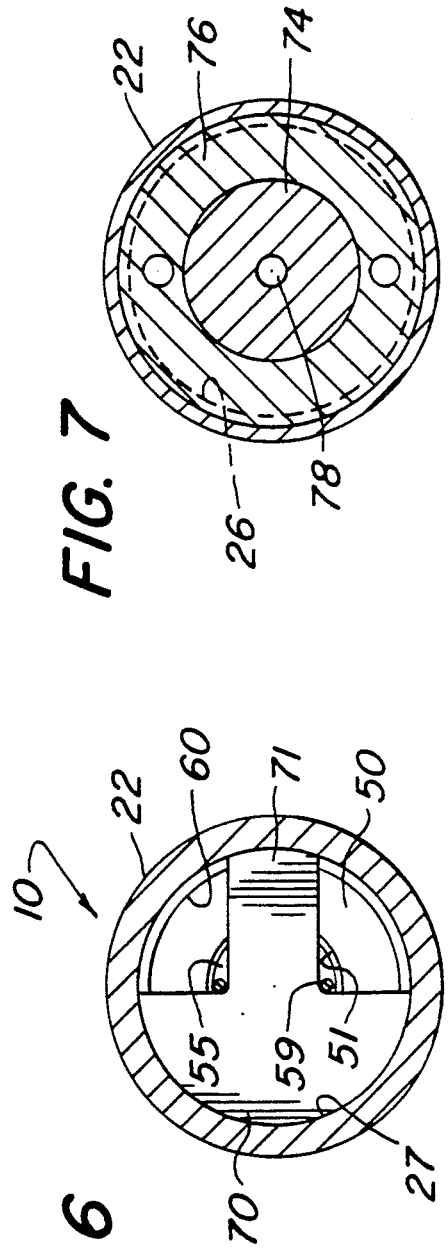
FIG. 4
FIG. 7
FIG. 6

PORTABLE CUTTER TOOL

BACKGROUND AND SUMMARY OF THE INVENTION

This invention relates generally to a tool for cutting objects requiring a substantial force to achieve the cutting thereof. More particularly, the invention relates to a portable cutter tool for general use at an emergency scene, such as an automobile accident, for extricating a victim trapped in the automobile.

There is a need in the emergency rescue field for a cutter tool that is portable, compact, powerful, lightweight, self-contained and that can be operated quickly and easily. Furthermore, there is a specific need for a portable cutter tool that can be used at an accident scene to extricate a victim that is trapped in place by the foot pedals and/or steering wheel of the vehicle. The present-day tools used for this type of emergency operation are not entirely satisfactory. A major problem with these present-day cutter tools is their excessive weight and size and their lack of the maneuverability necessary to quickly and easily extricate a victim trapped in an automobile wreck, by the foot pedals and/or the steering wheel thereof.

It is the general object of the invention to provide an improved portable cutter tool for use at an emergency scene that is more compact, is lighter in weight, safer and has improved maneuverability as well as being easy to manufacture and service in the field.

To this end, the portable cutter tool of the invention has the ability to maneuver into tight locations, such as the location of the foot pedals and the steering wheel of an automobile, and to make the needed cuts to free a trapped victim. The improved maneuverability of the cutter tool of the invention results from the provision of a swivel assembly comprising a swivel, a seal and an end cap for connecting the hose for the operating fluid to the housing for the cutter which housing contains the piston and cutter blades actuated by the pumping of the operating fluid. More specifically, the swivel assembly includes an outlet connection which extends at 45° to the cutter housing. This 45° outlet connection improves the maneuverability of the cutter tool by allowing the hose to swing out of the way as the housing is maneuvered into a cutting position. Since the hose has a rigid reinforcement at the end whereat it is connected to the housing, it is very important to be able to rotate the hose to change the direction at which it joins with the cutter housing without moving the hose or increasing the effective length of the tool.

The compactness of the portable cutter tool of the invention is enhanced by the provision of a cutter housing that is made of a single-piece integral cylinder and head. This construction eliminates the need for an interface connection between the required cylinder and a housing and thereby results in a more compact and lighter weight tool. Moreover, an integral piston stop is provided in the head which eliminates the need to step the piston or create a stop in the cylinder. The stop is necessary to avoid overextension of the piston and possible hydraulic fluid loss if the blades, which are the primary piston stop, are removed or broken for some reason. Also, this single-piece construction of the cylinder and head permits the use of an unchanging cylinder bore for providing both the stop and the cylinder for the actuating piston. In addition, a cast groove is provided in the single piece housing to eliminate the need to cut a groove for a piston wiper, which makes the final machining of the housing quicker and easier. Another feature of the housing design is the provision of cast ribs which strengthen the cylinder and aid in the holding and positioning of the tool during cutting.

The compactness of the cutter is also enhanced by a piston design which results in a compact cylinder construction. To this end, there is provided a return spring which is incorporated within the interior of a hollow piston to thereby reduce the length of the cylinder while not affecting the piston diameter. Furthermore, the piston does not have to be provided with a step since the housing has a stop incorporated into it.

Another feature of the invention is the improved cutter blade or tip design. To this end, the cutter blade is designed to provide two identical cutter tips for both sides of the cutting area. By means of a simple rotation, the moving cutter tip could be replaced with the stationary tip if desired. Furthermore, the cutter tips have a compound angle which provides a strong tip and a gradual cutting angle that acts to provide relief and reduce the force required to perform a cut. Also, a tab is provided on the tip to keep a tip engaged in a guide slot therefor throughout the entire cutting movement. Also, a molybdenum-based coating is added to the tips for lubrication and corrosion protection from the elements.

Another feature of the invention is the provision of a self-contained tool which includes a pump and housing assembly capable of operating as a 10,000 psi system to produce a powerful cutter. There is provided a hand pump of the single stroke type wherein only eighty pounds of handle force can generate 10,000 psig of hydraulic pressure.

Another feature of the invention is to provide for safe operation whereby the cutter tool cannot be improperly connected or assembled. To this end, the outlet connection for the swivel and both the hose and the pump are provided with lefthand threads so that the pump and the hose cannot be connected to any other tool which could result in an unsafe operating situation.

The head portion of the cutter housing is constructed to provide a wide support area near the cutter tips. This construction serves to limit the angle that a part to be cut can take relative to the cutter tips whereby the possibility that the cutter will slip relative to the part during the cutting movement is minimized.

BRIEF DESCRIPTION OF THE DRAWINGS

FIG. 4 is a sectional view taken on line 4—4 of FIG. 3.

FIG. 5 is a sectional view taken on line 5—5 of FIG. 3.

FIG. 6 is a sectional view taken on line 6—6 of FIG. 3.

FIG. 7 is a sectional view taken on line 7—7 of FIG. 3.

DETAILED DESCRIPTION OF THE PREFERRED EMBODIMENT

Figure 1:
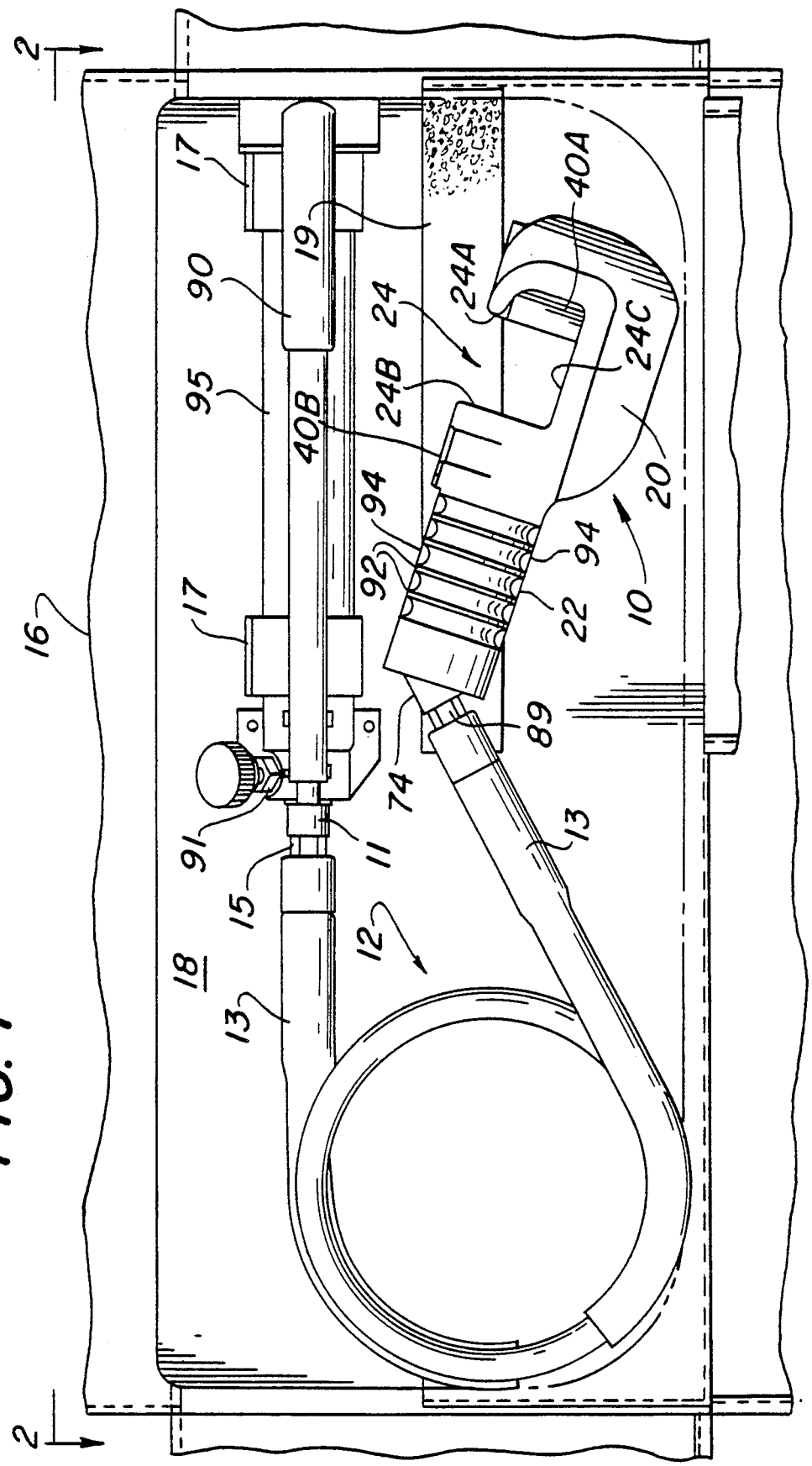
FIG. 1 is a plan view of a portable cutter tool in accordance with the invention shown positioned in a carrying case for the main components of the tool.

The portable cutter tool in accordance with the invention comprises three main components, namely, a housing 10, a fluid supply hose 12, and a hand pump 14, which components are adapted to be contained within a carrying case 16 as shown in FIG. 1. Hand pump 14 is removably secured within carrying case 16 by means of a pair of flexible, generally C-shaped, brackets 17, which hold hand pump 14 in position on a base 18 which rests on the bottom wall of the carrying case 16. Housing 10 is held in a stored position in carrying case 16 by a Velcro-type strap fastening means 19 with supply hose 12 being set in a coiled condition within the carrying case 16. The ends of supply hose 12 are threadedly engaged with housing 10 and hand pump 14 as shown in FIG. 1. When the portable cutter tool is to be used, the housing 10, supply hose 12 and hand pump 14 are removed from the carrying case 16 as a unit, either with or without the base 18, and supply hose 12 is uncoiled and extended to an elongated condition as the housing 10 is maneuvered into a cutting position within an automobile wreck or other site.

Housing 10 has an elongated configuration and includes a head portion 20 at one end thereof and a cylinder portion 22 at the other end thereof. Housing 10 is a single-piece cast part forming housing and cylinder portions 20 and 22 integrally. Housing 10 is machined with suitable bores, slots, and threads in a manner to contain the working parts of the tool in a manner to be described hereafter.

Figure 3:
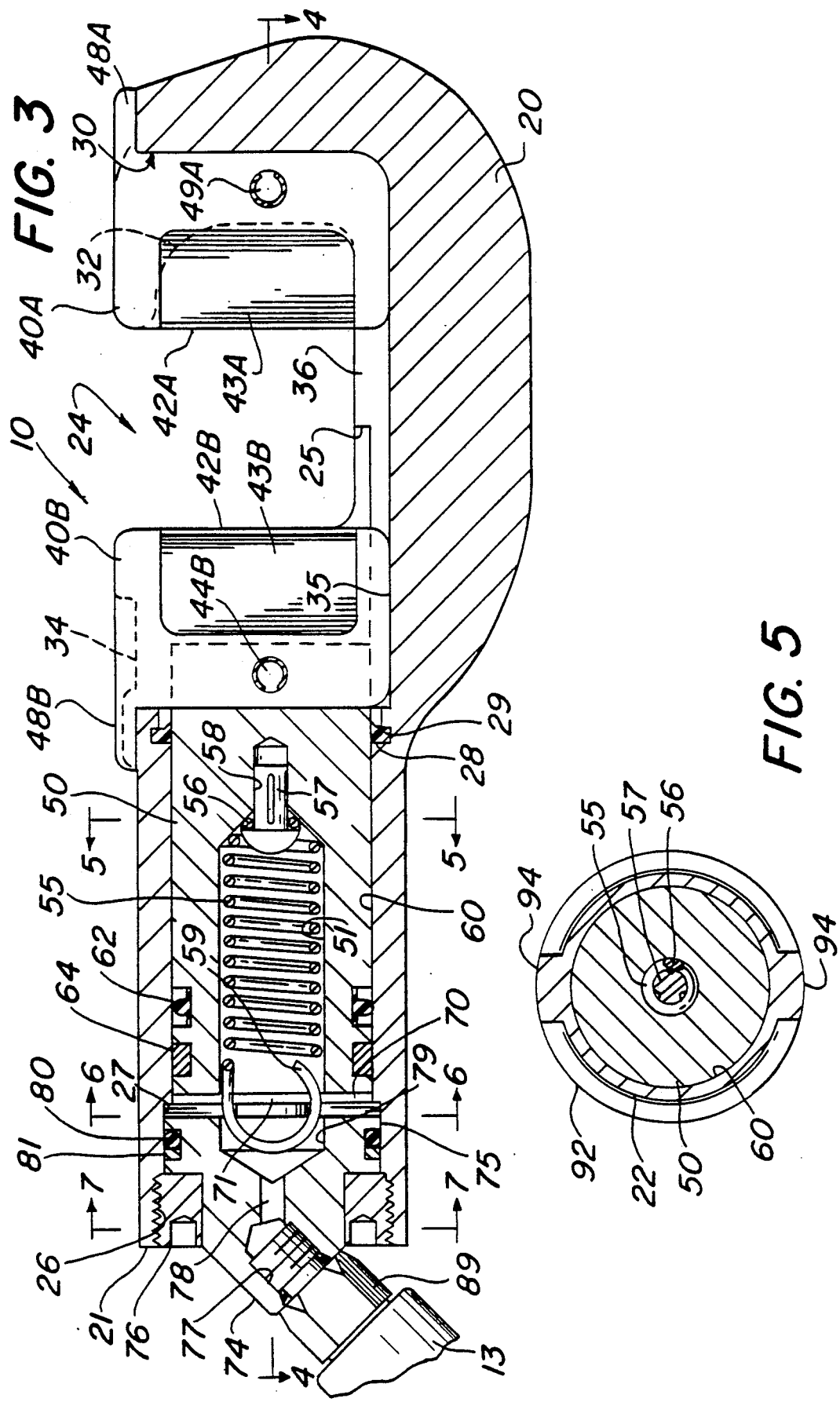
FIG. 3 is a sectional view of the housing of the portable cutter tool showing the cutting members in the open position thereof.

Head portion 20 has a generally C-shaped configuration defining an open mouth 24 for encompassing an article to be cut. Head portion 20 has a slot 30 cut therein in the region of mouth 24 to extend longitudinally and laterally along the center of housing 10. Slot 30 is constructed and arranged to provide means for mounting a first (fixed) cutting member 40A in head portion 20 at one end of housing 10 on one side of mouth 24 and a second (movable) cutting member 40B in alignment with cutting member 40A on the other side of mouth 24 (FIG. 3). Cutting member 40A has its cutting blade or tip 42A facing inwardly and cutting member 40B has its cutting blade or tip 42B facing cutting tip 40A. Cutting member 40B is mounted for movement from an open position shown in FIG. 3 across mouth 24 to a closed position shown in FIG. 8 during a cutting movement thereof as will be described hereafter. Slot 30 is constructed and arranged to guide cutting member 40B through said cutting movement.

Pursuant to the above-described functions thereof, slot 30 is comprised of a slot portion 32 located on one side of mouth 24 and adapted to receive the cutting member 40A which is fixedly secured in this slot portion 32 by a pin 44A. Pin 44A extends through a transverse hole 46A in cutting member 40A and is secured in a transverse bore 26 formed in head portion 20 on opposite sides of slot portion 32 as is best shown in FIG. 4. Slot 30 also comprises slot portions 34 and 35 on the opposite sides of the mouth 24 from slot portion 32 and adapted to slidably receive the movable cutting member 40B at outer and inner portions thereof, respectively. Slot portions 34 and 35 are spaced apart because slot 30 intersects with a cylindrical bore 60 for a piston 50 to be described hereafter.

Figure 8:
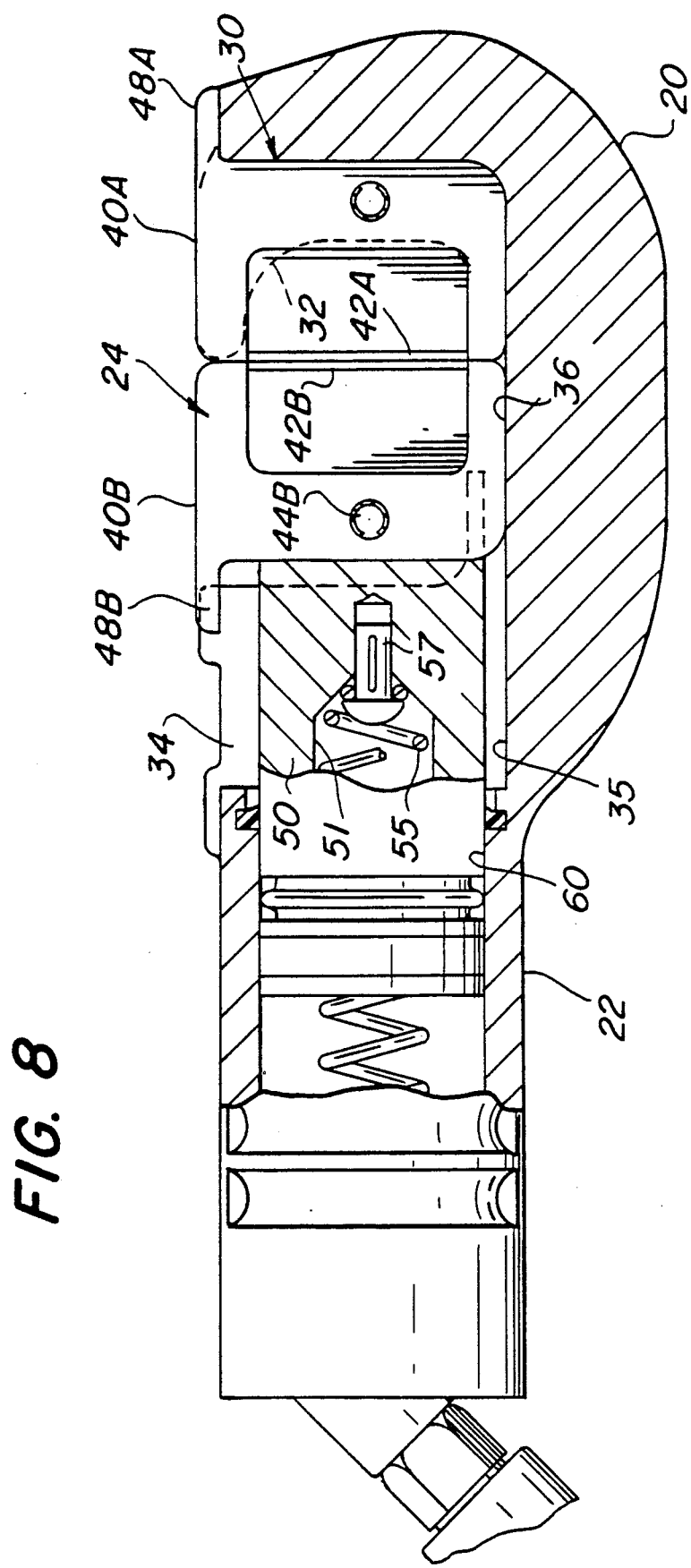
FIG. 8 is a sectional view of the head portion of the housing with the cutting members shown in the closed position thereof.

Cutting member 40B is secured on the end of an actuating piston 50 by means of a pin 44B which extends through a transverse hole 46B in cutting member 40B and is secured in a transverse bore 52 in the end of piston 50. Piston 50 is actuated by the hydraulic fluid pumped from hand pump 14 as will be described more fully hereafter to cause cutting member 40B to move through a cutting movement from the open position shown in FIG. 3 to a closed position shown in FIG. 8. Slot 30 guides cutting member 40B through said cutting movement and, to this end, slot 30 includes a slot portion 36 at the bottom of mouth 24 constructed and arranged to slidably engage the bottom or inner portion of cutting member 40B as it moves away from the open position shown in FIG. 3 through said cutting movement. The outer portion of cutting member 40B is slidably received in the slot portion 34 as it moves through said cutting movement. Cutting member 40B is provided with a rearwardly extending tab 48B constructed and arranged to be slidably received in slot portion 34 throughout the entire cutting movement thereof. Thus, as shown in FIG. 8, tab 48B is maintained in sliding engagement with slot portion 34 at the end of the cutting movement of cutting member 40B, which arrangement maintains the stability of cutting member 40B during the final stages of the cutting movement.

As is best shown in FIG. 4, the cutter tips 42A and 42B are formed with a compound angle with the tip ends being formed at a wider angle than the adjacent portions 43A and 43B of the cutting members 40A and 40B, respectively. This provides a stronger tip and a more gradual cutting angle that acts to provide relief and reduce the force required to perform a cut.

As is apparent from the drawings, the cutting members 40A and 40B are provided with an identical configuration and construction. Accordingly, by means of a simple rotation, the moving cutting member 40B could be replaced by cutting member 40A and visa versa. Thus, it is noted that cutting member 40A is provided with a tab portion 48A identical to the tab portion 48B described above and the holes 46 and 46B for receiving the pins 44A and 44B are located in the same position. Also, both the cutting members 40A and 40B have a molybdenum-based coating added to the tips thereof for lubrication and corrosion protection from the elements.

Cylindrical portion 22 has a cylindrical bore 60 formed therein extending in alignment with cutting member 40B and slot 30 as shown in the drawings. Bore 60 is an unchanging bore and extends from a counterbore 27 in the outer end 21 of cylinder portion 22 into slot 30 between slot portions 34 and 35 and partially into slot portion 36 to terminate therein to form a stop 25 for piston 50. The cylinder portion 22 is provided with a threaded bore 26 extending between end 21 and counterbore 27 for use in mounting the swivel means as will be described more fully hereafter. A cast groove 28 is provided in cylinder portion 22 of housing 10 and serves to receive a piston wiper 29 whereby the final machining of the housing 10 is quicker and easier. Bore 60 slidably receives piston 50 and is contacted by an annular T-seal 62 and a wear ring 64 mounted in grooves in the exterior wall of piston 50.

The actuating piston 50 is mounted for sliding movement within bore 60 through an actuating movement from a first position shown in FIG. 3 to a second position shown in FIG. 8. Piston 50 is operatively engaged with cutting member 40B by the pin 44B to thereby actuate cutting member 40B through said cutting movement thereof as the piston 50 is actuated from said first and second positions thereof.

There is provided a spring means for biasing piston 50 toward the first position thereof shown in FIG. 3. To this end, the piston 50 has a bore 51 therein on the high pressure side thereof to form a hollow construction and the spring means comprises a tension spring 55 extending within the hollow portion provided by bore 51. One end 56 of the tension spring 55 is secured to the piston 50 by means of a grooved pin 57 that secures the inner end of the spring 55 to the piston 50. The pin 57 is received in a small bore 58 in the end of piston 50 by a pressed fit and has grooves cut in the sides thereof to create an interference fit to increase the holding power of the pin 57 within the bore 58 in piston 50. Means are provided for securing the other end of the tension spring 55 at a fixed location of housing 10 outwardly of piston 50. Such means comprises a spring retainer 70 which is held in the inner end of the counterbore 27 by the swivel means as will be described hereafter and has a tab 71 extending in alignment with the bore 51 in piston 50, spring 55 having a loop portion 59 extending around tab 71 to secure the end of spring 55 at this location.

In accordance with the invention there is provided a novel means for connecting the downstream end of supply hose 12 to the cylinder portion 22 of housing 10. Such means comprises a swivel-type hose connecting means including a swivel member 74 rotatably received in counterbore 27 and an end cap 76 threadedly engaged with threaded bore 26. End cap 76 cooperates with an enlarged cylindrical portion 75 of swivel member 74 which rotatably contacts counterbore 27 whereby swivel member 74 is mounted for rotation about its longitudinal axis, which axis also coincides with the longitudinal axis of counterbore 24 and cylinder bore 60. The swivel member 74 is provided with a flow fitting connection for engaging the downstream end of supply hose 12 in a fluid tight manner, said connection comprising a threaded bore 77 communicating with the exterior of the swivel member 74 and adapted to be threadedly engaged with the outlet fitting 89 on the downstream end of supply hose 12.

The swivel member 74 also has a passage means for the flow of high pressure hydraulic fluid from outlet fitting 89 at the downstream end of the supply hose 12 to the interior of said cylindrical bore 60 on the high pressure side of piston 50. Such passage means comprises a longitudinal bore 78 in the swivel member 74 communicating with a counterbore 79 on the interior end thereof in communication with the upstream end of bore 60 and the high pressure side of piston 50.

The threaded bore 77 in the swivel member 74 is constructed and arranged to extend at an angle of about 45° to the rotational axis of the swivel member 74 so that supply hose 12 joins housing 10 at said angle. This arrangement improves the maneuverability of the cutter tool within tight spaces since it allows the user to swing the hose 12 out of the way while positioning the cutter housing 10 in a cutting position. This is particularly important since the high pressure supply hose 12 is provided with a rigid reinforcement sleeve 13 on both the downstream end and the upstream ends thereof. Thus, it is important to be able to rotate the hose 12 to change the direction thereof without moving the tool or increasing the effective length of the tool, which objective is achieved by the rotatable, angled, swivel arrangement described above.

The swivel means also includes means providing a seal between the cooperating walls of the counterbore 27 and the opposed cylindrical wall of enlarged portion 75 of the swivel member 74. Said seal is formed by an O-ring seal 80 in cooperation with a backup ring 81 which is a conventional sealing arrangement used in the art.

Figure 2:
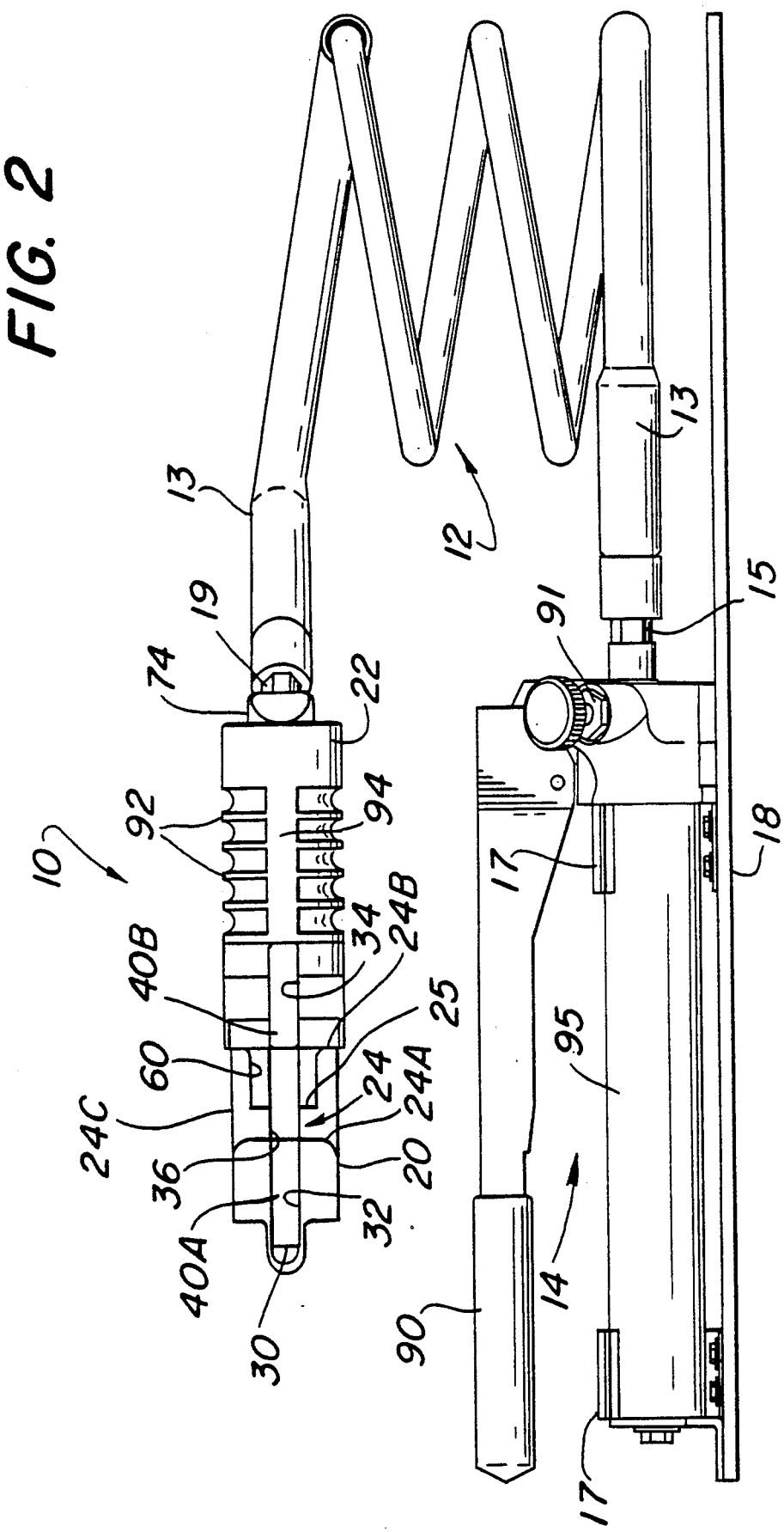
FIG. 2 is a view taken generally on line 2—2 of FIG. 1 with the housing raised above the carrying case for illustrative purposes.

As is shown in FIGS. 1 and 2, the upsteam end of the supply hose 12 is connected by a threaded fitting 19 to the output connection 11 of the hand pump 14. The hand pump 14, which is available commercially, is of the single stroke hydraulic type capable of generating 10,000 psig with only eighty pounds of force applied to the handle 90 of the pump 14. Supply hose 12 is a non-conductive type rated for 10,000 psig working pressure.

In order to strengthen the cylinder portion 22 of the housing 10 and to aid in the holding and positioning of the tool during cutting, on the outside of the cylinder portion 22 of housing 10 there are cast a plurality of circumferentially extending ribs 92 and a pair of diametrically opposite longitudinally extending ribs 94 as shown in FIGS. 1, 2 and 4.

In order to provide a safety feature so that the pump 14 and the hose 12 cannot be used with any other tool, the threaded connection between outlet fitting 89 and threaded bore 77 and the threaded engagement between pump outlet connection 11 and threaded fitting 15 of hose 12 are formed of lefthand threads.

The above-described design of the portable cutter tool in accordance with the invention solves the need in the art for a small, powerful, light and quick cutter tool for general use at an emergency scene and is specifically adapted for cutting vehicle pedals and steering wheel rings. In the use of the portable cutter tool of the invention, the tool is removed from its carrying case 16 and the housing 10 is maneuvered into the cutting position, the design providing the necessary maneuverability for getting into tight locations and making the needed cuts to free a trapped victim. In the stored position of the tool the cutting member 40B is in its open position as shown in FIG. 3. Once the housing 10 is maneuvered to encompass the article to be cut within the mouth 24 of head portion 20, the hand pump 14 is operated by the application of a pumping action to the handle 90 whereby hydraulic fluid is pumped from the pump reservoir 95 past control valve 91 (which is set in its PUMP position) and through outlet 11 to pump 14 to flow through supply hose 12 and fitting 89 into the passage means of the swivel member 74. Thus, the hydraulic fluid passes through threaded bore 77, longitudinal passage 78 and counterbore 79 into the outer end of cylinder bore 60 on the high pressure side of piston 50. As the hydraulic fluid is pumped into bore 60, it forces the piston 50 to move from the position shown in FIG. 3 to the position shown in FIG. 8. During this cutting movement, the movable cutter 40B cuts through the article contained within mouth 24 and the cut is completed when the cutting member 40B reaches the position shown in FIG. 8 with the cutting tips 42A and 42B coming into contact. When the cutting operation is completed and control valve 91 is set to its RETURN position, the return spring 55 acts to return the piston 50 from the position shown in FIG. 8 to the position shown in FIG. 3 which movement also returns the cutting member 40B to the position shown in FIG. 3. Control valve 91 is conventional and comprises a needle valve arrangement. There is also provided, as is conventional, a relief valve means (not shown) to insure that the pump pressure does not rise above 10,000 PSI.

As is shown in the drawings, head portion 20 has a pair of rib-like wall portions 24A and 24B defining the sides of mouth 24 and a wall portion 24C defining the bottom of mouth 24, said wall portions having cutting members 40A and 40C centered therein. Wall portions 24A and 24B are in spaced apart opposed relation. Wall portions 24A–C have a substantial width approximating the width of head portion 20, to thereby limit and minimize the angle an article to be cut can take relative to cutting members 40A and 40B and the path of the cutting movement when said article is contained within mouth 24.

It will be evident that the portable cutter tool of the invention may be used for cutting a wide variety of materials in addition to the uses typically involved in the rescue field. Thus, the tool can be used in the construction field to cut rebar, bolts and other small tubing and pipe. It can also be used for forced entry by cutting locks and window bars.

What is claimed is:

1. A portable cutter tool constructed and arranged to be maneuverable for extricating a victim that is trapped in place by the foot pedal of a vehicle by cutting the same to free the trapped victim comprising:

an elongated housing including a head portion and a cylinder portion, said heat portion being constructed to define an open mouth for encompassing an article to be cut, a first cutting member mounted in said head portion at one end of said housing and having a cutting tip facing inwardly, a second cutting member mounted in said head portion in alignment with said first cutting member and having a cutting tip facing said cutting tip of said first cutting member, said second cutting member being mounted for movement from an open position spaced apart from said first cutting member across said open mouth toward said first cutting member during a cutting movement, said housing providing means for guiding said second cutting member through said cutting movement thereof, said cylinder portion of said housing having a cylindrical bore formed therein extending in alignment with said second cutting member, an actuating piston mounted for sliding movement within said cylindrical bore through an actuating movement from a first position to a second position, said actuating piston being operatively engaged with said second cutting member for actuating the same through said cutting movement thereof as said piston is actuated from said first to said second position thereof, a supply hose for supplying fluid under a high pressure to the interior of said cylindrical bore on one side of said piston, said supply hose having a fluid flow connection on the downstream end thereof, means for connecting the downstream end of said supply hose to said housing, said hose connecting means including a swivel member and means for mounting said swivel member in said cylinder portion of said housing adjacent said cylindrical bore for rotation about an axis, said swivel member having a flow fitting connection for engaging said fluid flow connection on the downstream end of said hose in a fluid tight manner so that said supply hose and said swivel member are mounted for conjoint relative rotational movement with respect to the cylinder portion o said housing, said swivel member including a passage means for the flow of said high pressure fluid from the downstream end of said supply hose to the interior of said cylindrical bore on one side of said piston, said fitting connection being constructed and arranged to support said fluid flow connection and the downstream end of said supply hose to extend at an angle to said rotational axis of said swivel member to thereby improve the maneuverability of said cutting tool within tight spaces.

2. A portable cutter tool according to claim 1 wherein said swivel member mounting means includes a cylindrical cavity formed in said cylinder portion of said housing, said swivel member having a cylindrical portion rotatably mounted within said cylindrical cavity, and including means providing a seal between said cylindrical cavity and said cylindrical portion of said swivel member.

3. A portable cutter tool according to claim 2 wherein said swivel member mounting means includes an annular end cap threadedly mounted in the other end of said housing at a location outwardly of said cylindrical portion of said swivel member and adapted to hold said swivel member in position within said cylindrical cavity.

4. A portable cutter tool according to claim 1 wherein said fitting connection supports said supply hose to extend at an angle at about 45° to said rotational axis.

5. A portable cutter tool according to claim 1 wherein said piston has a hollow portion on said one side thereof, and including spring means biasing said piston toward said first position thereof, said spring means comprising a tension spring extending within said hollow portion of said piston, one end of said tension spring being secured to said piston, and means for securing the other end of said tension spring at a fixed location of said housing at a location outwardly of said piston.

6. A portable cutter tool according to claim 1 wherein said elongated housing is made of a single-piece integral head and cylindrical portions.

7. A portable cutter tool according to claim 6 including a piston stop provided in said head portion to restrict the movement of said piston in the direction said piston moves from said first position to said second position, said stop being formed by an unchanging cylindrical bore providing both said stop and said cylindrical bore for said actuating piston.

8. A portable cutter tool according to claim 6 wherein said housing has a groove therein extending circumferentially around said cylinder bore for said piston, said groove being cast in said housing and having a piston wiper mounted therein.

9. A portable cutter tool according to claim 6 wherein said cylinder portion of said housing is provided with a plurality of circumferential ribs which improve the strength thereof and aid in the holding and positioning of the tool during cutting.

10. A portable cutter tool according to claim 1 wherein said first and second cutting members have the same construction and configuration whereby either one could be replaced by the other.

11. A portable cutter tool according to claim 10 wherein said cutting tips are formed with a compound cutting angle for improving the strength thereof.

12. A portable cutter tool according to claim 1 wherein said guiding means for said second cutting member includes a first slot portion slidably receiving a first portion of said second cutting member at the bottom of said mouth during said cutting movement and a second slot portion slidably receiving an outer portion of said second cutting member, said second cutting member having a tab provided thereon extending rearwardly from the rear edge thereof, said second slot portion being adapted to slidably engage said tab throughout the cutting movement to thereby provide a good support therefor.

13. A portable cutter tool according to claim 1 including a hand operated pump of the single stroke type capable of generating a substantial hydraulic pressure, the output of said pump being connected to the upstream end of said supply hose.

14. A portable cutter tool according to claim 13 wherein said fitting connection between said swivel member and said supply hose and the connection between said supply hose and said pump are provided with lefthand threads so as to avoid connection of said parts with improper devices.

15. A portable cutter tool according to claim 1 wherein said head portion includes a pair of opposed spaced-apart walls defining the sides of said mouth, said walls having said cutting members centered therein and having a substantial width approximating the width of said head portion to thereby minimize the angle an article to be cut can take relative to the cutting members when contained within said mouth during a cutting movement.

* * * * *